Sept. 18, 1945.  J. R. MILLAR  2,384,951
AUTOMOTIVE TRIM
Filed March 4, 1940
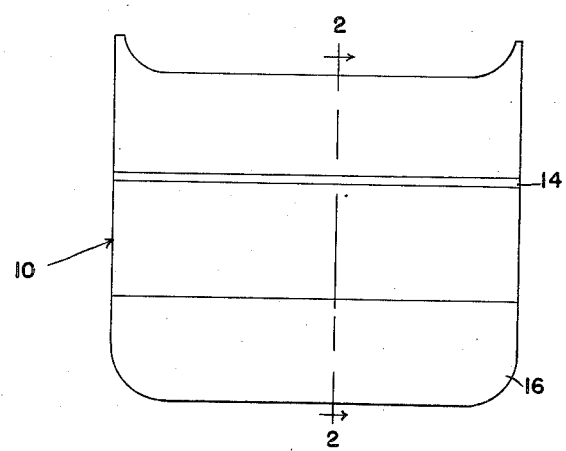
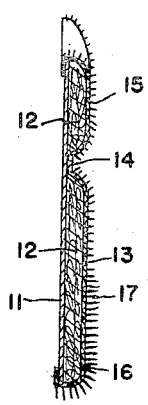
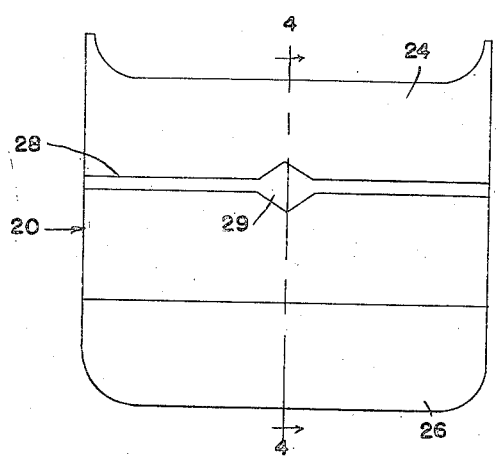
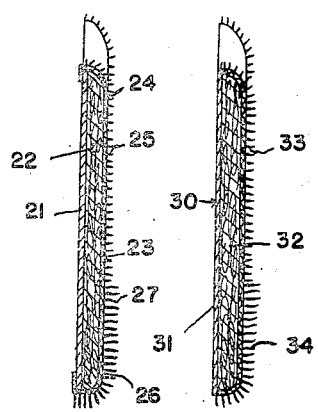
INVENTOR.
JOHN R. MILLAR
BY *Whittemore, Hulbert & Belknap*
ATTORNEYS.

Patented Sept. 18, 1945

2,384,951

UNITED STATES PATENT OFFICE 2,384,951

AUTOMOTIVE TRIM

John R. Millar, Reno, Nev., assignor to National Automotive Fibres, Inc., Detroit, Mich., a corporation of Delaware Application March 4, 1940, Serial No. 322,248

3 Claims. (Cl. 117—13)

The present invention relates to automotive trim and more particularly to an automotive trim characterized by a decorative effect achieved by multiple flocking.

The invention is applicable to a wide variety of the parts, such for example as arm rests, door panels, other trim panels and the like. For purposes of illustration I have shown the same as applied to door panels, but it will be understood that this specific disclosure is not intended to be limiting.

At the present time many interior parts of automotive vehicles, such for example as trim panels, arm rests and the like, are upholstered or covered with trim material. In some cases padding material, such for example as loosely aggregated cotton, blue wadding or the like, is provided beneath the trim material in order to provide richness or fullness to the appearance and feel of the article.

Recently there has been a tendency to improve the appearance of the interior of the automotive vehicle by providing multicolored trim. Thus, for example, door panels have been made having two or more different colors of cloth combined to provide the covering trim material. Prior to the present invention this has been accomplished only by cutting different colored fabrics and sewing the same together to provide the different colors referred to. Furthermore, the decorative effect has been strictly limited due to the impracticability of providing more or less complex designs of contrasting colors.

According to the present invention the units making up the automotive trim may be provided with unique and attractive decorative effects characterized by contrasting or harmonizing colors and/or designs in the fabric raised relative to the other portions thereof.

Broadly described the decorative effects accomplished by the present invention are achieved by the following steps: The article to be decorated is provided with adhesive, after which flock of conventional type, or flock differing from ordinary flock in that it includes fibers of substantial length, is shifted or otherwise applied to the adhesive coated surface. At the same time the article being decorated is being strongly vibrated, with the result that the flock fibers are caused to adhere in a random arrangement in which a substantial number are adhered only at one end and are generally upstanding from the surface of the article. This surfacing of flock may extend over the complete article or, if preferred, certain areas of the article may be masked by providing suitable masking elements during the flocking operation.

In the event that the first flocking operation is carried out over the entire surface of the article the further flocking is accomplished by providing a second coating of adhesive over certain designated areas of the article, after which a second flocking operation is carried out. During the second flocking operation flock of different color characteristics or different physical characteristics, or flock having the same characteristics as that first used may be applied. During the second flocking operation the areas which are not coated with adhesive may be, and preferably are, masked by suitable masking elements. If flock having different color characteristics is applied, it will be apparent that the areas flocked during the second operation will differ in color from the background of the article thus decorated. Obviously the colors may be contrasting or harmonizing, as desired. In the event that the flock employed during the second flocking operation is of the same color but different physical characteristics from the flock employed during the first flocking operation, it will be evident that raised designs having a different surface appearance will result. In the event that the flock employed during the second flocking operation is identical with the flock employed during the first flocking operation, it will be evident that the article will be characterized by raised designs having the same surface appearance and texture as the background of the article.

In a preferred form of my invention I apply the foregoing principles to the production of trim panels for use on vehicle doors, and in this embodiment of my invention I provide a relatively coarse, relatively long, flock or pile material over the bottom of the trim panel. This in the completed article closely simulates a woven carpet such as is at the present time employed as a kick pad or scuff pad. Not only does the lower portion of the door panel, when made in accordance with the present invention, simulate woven carpet in appearance, but it also provides a strong wearing surface having the same utility as the woven carpets at present employed. As will be apparent, the cost of the article made in accordance with the present invention is very substantially lower than previously manufactured articles of similar utility.

With the foregoing general remarks in view, it is an object of the present invention to provide decorative automotive trim characterized by a pleasing surface appearance provided by multiple flocking.

It is a further object of the present invention to provide interior trim having flocked surfaces characterized by areas of different color or surface characteristics.

It is a further object of the present invention to provide interior trim for automotive vehicles having the surface appearance of pile fabric, such as mohair or the like, in which the surface appearance is provided by a flocking operation employing fibers of sufficient length to simulate the pile of mohair or the like.

It is a further object of the present invention, as a specific embodiment, to provide trim panels for automotive vehicles having the aforementioned characteristics.

It is a further object of the present invention to provide trim panels for application to vehicle doors and the like having an upper portion characterized by the presence of flock attached thereto in generally upstanding relation so as to simulate conventional upholstery material in combination with a lower flocked portion in which the fiber elements are relatively long and relatively coarse so as to simulate in appearance and utility the pile of woven carpet.

Other objects of the invention will be apparent as the description proceeds, and when taken in conjunction with the accompanying drawing.

Figure 1 is an elevation of a trim panel made in accordance with the present invention;

Figure 2 is a section on the line 2—2 of Figure 1;

Figure 3 is a front elevation of a trim panel illustrating a somewhat different embodiment of my invention;

Figure 4 is a section on the line 4—4 of Figure 3; and

Figure 5 is a sectional view similar to Figure 4 illustrating another embodiment of my invention.

It is the present practice in motor vehicles to provide an interior trim including trim panels secured to the inside of the doors of vehicles. These trim panels are commonly composed of panel boards, an intermediate ply of padding material such for example as loosely aggregated cotton, blue wadding or the like, and an upholstery trim which may be mohair, broadcloth and the like. Fabrics of a kind suitable for this purpose are relatively expensive and their cost amounts to a substantial percentage of the cost of the completed trim panel.

According to the present invention I propose to avoid the use of these expensive fabrics and to employ a relatively cheap fabric such as sheeting, muslin, cambric or the like, or in some cases to avoid the use of any fabric at all. The cost of the fabrics referred to above are only a fraction of even the most inexpensive upholstery trim fabrics now employed. In producing the article according to the present invention, I provide a coating of plastic adhesive. Where the article is provided with the relatively cheap fabric referred to above, this adhesive coating is applied directly over such fabrics. In other cases, as suggested, the adhesive may be applied directly to a panel board or other article to be decorated, or in some cases it may be applied directly to the surface of a suitable padding material, such as a smooth surfaced felt or the like.

I then vibrate the trim panel or other article at a high rate while sifting flock downwardly thereon. The flock employed is characterized by the presence of a substantial percentage of relatively long fibers, the fibers being of sufficient length to simulate the pile of mohair or related fabrics. Due to the rapid vibration, some of the individual fibers of the flock will stand more or less upright and will create a surface appearance similar to velvet, mohair and the like, depending upon the nature and length of the fibers employed. The fibers may be colored as desired, and the adhesive or cement coating to which they are applied may also be similarly colored.

It is at the present time common practice to cover the lower portion of the panel board with carpeting, forming what is termed in the trade as a kick pad or scuff pad. This is for the reason that this portion of the door panel comes into contact with the feet of the occupant of the vehicle so that excessive wear would result if this portion of the panel were covered with ordinary trim fabric. I propose to provide a suitable wearing surface for the lower portion of the door panel by a flocking operation similar to the operation which applies the coating of upstanding fiber elements over the upper portion of the trim panel. Essentially this may be accomplished merely by the substitution of relatively long, coarse and stiff fiber elements for the finer fiber elements employed for the upper portion of the trim panel. These fiber elements may be of contrasting colors, and in the finished product give the lower portion of the trim panel the appearance of being covered with a woven carpet.

Referring to the drawing, I have illustrated the invention as applied to trim panels, although it will be understood that the invention is not limited to trim panels and may be applied to any article in which it is desired to simulate the appearance of a trim fabric covering. In Figure 1 I have shown a trim panel 10 which comprises a panel board 11 and padding material 12. The padding material 12 may be loosely aggregated cotton or die-cut blue wadding or the like. In this figure I have illustrated the padding material 12 as applied in two sections, an upper section covering the upper portion of the panel board 11 and a lower section covering the lower portion of the panel board. Over the panel board and the associated padding material I provide a fabric 13 which, as seen in this figure, has its edges bent around and secured to the rear surface of the panel board 11. Along a zone indicated at 14 the fabric 13 is secured directly to the panel board. This is for the primary purpose of preventing downward movement of the padding material due to vibration of the vehicle. It serves the additional function of providing a decorative band across the panel board. It will be evident, and as shown in Figure 2, above and below the band 14 the fabric 13 is formed outwardly by the padding material therebeneath to provide richness of appearance.

In order to complete the desired surface appearance of the fabric 13, the same is covered with fibrous material, as will now be described.

According to one embodiment of the invention the fabric 13, prior to its assembly with the panel board, may be flocked uniformly over its whole surface. This will create a pile simulating surface which will give the fabric the appearance of mohair, velvet or the like. According to another embodiment of the invention the sheeting or other fabric 13 may be applied to the panel board in unflocked condition, after which the entire surface thereof may be covered with adhesive and flocked as above described. The invention also contemplates the provision of a fabric, which in the final product will have certain surfaces unflocked; in which case, of course, the fabric will be selected so that its surface appearance when unflocked is suitable for interior trim. Thus for example the present invention may be applied to further decorate conventional trim material such as mohair, broadcloth, or any other fabric.

The flock covering for the fabric 13 is indicated at 15, which illustrates the fibers as substantially upstanding. The fibers 15 which cover the upper surface of the board may be arranged in multicolored patterns by the expedient of masking desired portions of the article during a first flocking operation and then subsequently flocking the previously masked portions with a flock of different color. A similar result can of course be obtained by employing a multiple stage flocking operation in which the flock employed may have the same color characteristics but may differ in other physical characteristics, such as for example length, fineness and the like.

In this figure I have illustrated a lower portion 16 of the trim panel covered with relatively long, relatively coarse fibers 17. These fibers may conveniently contain a substantial proportion of animal hair, such as goat hair cut into fibers or filaments of substantial length, the length being sufficient to simulate the pile of woven carpets in the completed article. These fibers 17 may be applied directly to the trime fabric, in which case the lower portion of the fabric 13 will be masked during the initial flocking operation. If preferred, the fibers 17 may be applied over the relatively fine fibers 15 used to cover the upper surface of the trim panel. In this case a coating of adhesive is applied directly over the previously flocked surface, after which the relatively coarse fibers 17 are applied as above described.

In Figures 3 and 4 I have illustrated a somewhat similar embodiment of the invention. In these figures a trim panel 20 comprises the panel board 21, padding material 22 and a cover fabric 23 applied over the padding material 22 and having its edges secured to the rear of the panel board as shown in Figure 4. This embodiment of the invention differs primarily from that shown in Figures 1 and 2 in that the fabric 23 is not attached directly to the front surface of the panel board. The padding material 22 may be loosely aggregated cotton, blue wadding or the like and is preferably adhered or otherwise attached to the panel board 21 to avoid downward movement thereof due to the vibration of the vehicle.

The fabric 23 may be similar to the fabric 13 previously described and may be sheeting, muslin, cambric or the like. As in the previous embodiment it may be flocked previous to attachment to the panel board or it may be flocked after attachment to the panel board by providing adhesive thereon and sifting flock of desired characteristics on the adhesive coated surface. I have illustrated the upper surface of the panel board, as shown at 24, as provided with relatively fine fibers 25 of a kind adapted to simulate the pile of velvet, mohair or the like. As in the preceding embodiment, the lower portion of the panel board 26 is provided with relatively long, relatively coarse fibers 27 adapted to simulate in appearance and utility the pile in woven carpets.

As best seen in Figure 3, the upper portion of the trim panel may be provided with a multicolored decoration. In this figure I have shown a band 28 extending across the trim fabric and having an intermediate diamond shaped portion 29. The band 28 and the diamond shaped portion 29 may be of a color contrasting to the balance of the upper portion 24 of the trim panel.

The provision of the band 28 and the diamond shaped element 29 may be accomplished in different manners. If the fabric 23 applied to the panel board 21 is previously unflocked, the flocking may be accomplished in a two stage operation in which a mask is provided which conceals the fabric throughout the areas 28 and 29. After the flock has been attached to the band of the upper portion of the fabric, the mask may be removed and flock of different color characteristics may be applied to the areas 28 and 29. During this operation the previously flocked portion may be masked or not as desired. Preferably, however, it is masked to prevent attachment of the fibers intended for the areas 28 and 29 to the other portions.

As an alternative the entire surface of the fabric 23 may be flocked, after which a second coating of adhesive may be applied to the areas 28 and 29 and a second flocking operation carried out. If the flock employed during the second flocking operation is of a different color, it will be evident that the areas 28 and 29 will have different color characteristics and in addition will be somewhat raised relative to the surrounding surface. If the flock employed to cover the areas 28 and 29 is of the same color as the balance of the flock, the design will appear solely as a raised design of the same color as the background.

In this embodiment of the invention as in the preceding embodiment, I prefer to cover the lower portion of the panel board with the relatively long, relatively coarse fibers 27 as previously described.

Referring now to Figure 5, I have illustrated a somewhat different embodiment of my invention in which the trim panel generally indicated at 30 comprises a panel board 31 and an overlying ply of padding material 32. This padding material is strongly coherent, such for example as strongly felted fibrous material. The padding material 32 might also take the form of a sponge or foam rubber. In this case it is unnecessary to provide the covering fabric such as illustrated at 13 in Figure 2 or 23 in Figure 4. The surface of the padding material 22 has the adhesive applied directly thereto, after which the flocking is carried out. As in the preceding embodiments I have illustrated in this figure a relatively fine fiber flock 33 covering the upper portion of the trim fabric, and a relatively coarse fiber flock 34 covering the lower portion of the trim panel and adapted to simulate in appearance and utility the pile of woven carpet. It will be appreciated that the flock may be applied as in the preceding embodiment to present any desired surface appearance, as a uniform pile surface or a pile surface having areas of the desired design contrasting in color, surface texture, or height with the balance of the area.

Along the same line but as a slightly different modification, it is possible to produce a unitary panel board having sufficient rigidity and which at the same time is so formed that one side thereof has the same characteristics as a padded panel board. A board of this type could be produced by forming a relatively thick ply of material having the desired resiliency suitable for padding material, and by treating one side thereof to render the same rigid and preferably smooth. The soft or padded side of this board could then be flocked as suggested above.

The trim material may be manufactured in a continuous process by advancing the same over a conveyor past the flocking stations. The vibration may be carried out by providing rotating beaters beneath the conveyor, over which the article will continuously advance, or if preferred the article may be advanced over a vibrator of any desired type and retained in position over the vibrator without further advance during the flocking operation. The adhesive or cement employed may be of any suitable type, and I have found that excellent results are obtained by employing cements containing rubber which may be vulcanized after the flocking operation is completed.

The flock which I apply to the upper portion of the panel board is preferably of a much finer character. This flock may be of cotton, wool, silk or suitable artificial fibers and will ordinarily be of considerably less length than the fibers in the area 16. These fibers, however, are preferably of sufficient length so that when applied in conjunction with rapid vibration, previously referred to, they stand upright to a considerable degree and simulate mohair, velvet or the like, depending upon the length and character of the fibers.

Following the flocking operation the cement is caused to set. The subsequent treatment will be dictated by the characteristics of the cement. In some cases the cement will air dry while in other cases, as for example where a vulcanizing rubber cement is employed, it will be necessary to heat treat the panel.

I desire to emphasize the fact that the flocking operation as performed herein gives rise to an entirely different effect from conventional flocking long familiar in the industry. Previously comminuted or ground flock has been employed to modify the surface characteristics of various materials, such for example as wall paper. According to the present invention the flock employed is cut flock of substantial length as contrasted with previously widely used comminuted or ground flock.

What I claim as my invention is:

1. In the manufacture of trim panels, the method of flocking an adhesively coated surface, comprising the steps of vibrating said surface and simultaneously depositing onto one area of said coated surface cut fibers having predetermined physical characteristics so that such fibers will be imbedded endwise in the adhesive coating on said surface to simulate the pile of velvet, mohair and the like, then vibrating said surface and simultaneously depositing onto an adjacent area of said surface cut fibers having different physical characteristics than the fibers aforesaid so that such fibers will be imbedded endwise in the adhesive coating on said surface to simulate a woven carpet.

2. In the manufacture of trim panels, the method of flocking an adhesively coated surface, comprising the steps of partially masking said coated surface, vibrating the coated surface and simultaneously depositing onto the unmasked coated surface cut fibers having predetermined characteristics so that such fibers will be imbedded endwise in the unmasked adhesive coating on said surface to simulate the pile of velvet, mohair and the like, then unmasking the masked area of said surface, then masking the imbedded fibers, then vibrating the coated surface and simultaneously depositing onto the previously masked coated surface cut fibers having different characteristics than the fibers aforesaid so that such fibers will be imbedded endwise in the unmasked adhesive coating on said surface to simulate a woven carpet.

3. In the manufacture of trim panels, the method of flocking different areas of adhesively coated fabric, comprising the steps of vibrating said fabric and simultaneously depositing onto one area of said coated fabric relatively short fine cut fibers so that such fibers will be imbedded endwise in the adhesive coating on said fabric to simulate the pile of velvet, mohair and the like, then vibrating said fabric and simultaneously depositing onto another area of said fabric relatively long coarse and stiff fibers so that such fibers will be imbedded endwise in the adhesive coating on said fabric to simulate a woven carpet.

JOHN R. MILLAR.